United States Patent
Ichimura (10) Patent No.: US 9,791,679 B2
(45) Date of Patent: Oct. 17, 2017

(54) IMAGING OPTICAL SYSTEM FOR FORMING HIGH-DEFINITION IMAGE AND IMAGE PROJECTION APPARATUS HAVING THE SAME

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 14/923,644

(22) Filed: Oct. 27, 2015

(65) Prior Publication Data
US 2016/0139382 A1    May 19, 2016

(30) Foreign Application Priority Data
Nov. 14, 2014   (JP) .................................. 2014-231453

(51) Int. Cl.
G02B 15/177   (2006.01)
G02B 13/16    (2006.01)
G02B 13/04    (2006.01)

(52) U.S. Cl.
CPC ........... *G02B 15/177* (2013.01); *G02B 13/16* (2013.01); *G02B 13/04* (2013.01)

(58) Field of Classification Search
CPC ..... G03B 21/14–21/147; G02B 15/177; G02B 15/20; G02B 13/16; G02B 13/04
(Continued)

(56) References Cited

U.S. PATENT DOCUMENTS 6,747,815 B2   6/2004  Takatsuki
8,693,105 B2*  4/2014  Nagatoshi ............ G02B 15/177
                                                        359/663

(Continued)

FOREIGN PATENT DOCUMENTS

DE    19723226 A1    12/1997
JP    2003222793 A   8/2003
(Continued)

OTHER PUBLICATIONS

Machine translation of JP 2012-118243, retrieved electronically from Espacenet, Feb. 13, 2017.*
(Continued)

*Primary Examiner* — Joseph P Martinez
*Assistant Examiner* — Cara Rakowski
(74) *Attorney, Agent, or Firm* — Rossi, Kimms & McDowell LLP (57) ABSTRACT

An imaging optical system includes a first lens unit (B1) having a negative refractive power configured not to move for zooming from a wide-angle end to a telephoto end, and a plurality of lens units (B2 to B7) configured to move so that a space between lens units adjacent to each other changes during the zooming, the first lens unit includes a first lens subunit (B1a) having a negative refractive power, a second lens subunit (B1b) having a negative refractive power, and a third lens subunit (B1c) having a positive refractive power, the first lens subunit (B1a) is configured not to move for focusing from an infinity to a close range, and the second lens subunit (B1b) and the third lens subunit (B1c) constitute a focus moving unit configured to move, during the focusing, while a space between the second and third lens subunits is narrowed.

10 Claims, 11 Drawing Sheets

(58) Field of Classification Search
USPC ........ 359/680–682, 749–753, 713–716, 755, 359/761, 770, 781–783
See application file for complete search history.

(56) References Cited

U.S. PATENT DOCUMENTS 8,873,157 B2  10/2014  Imaoka
2017/0075094 A1* 3/2017  Imai ..................... G02B 15/177

FOREIGN PATENT DOCUMENTS

| | | |
|---|---|---|
| JP | 2011186269 A | 9/2011 |
| JP | 2012118243 A | 6/2012 |
| JP | 2013068690 A | 4/2013 |
| JP | 2014190999 A | 10/2014 |

OTHER PUBLICATIONS

Office Action issued in German Appln. No. 102015119674.3 dated Jun. 6, 2017. English translation provided.

* cited by examiner

IMAGING OPTICAL SYSTEM FOR FORMING HIGH-DEFINITION IMAGE AND IMAGE PROJECTION APPARATUS HAVING THE SAME

BACKGROUND OF THE INVENTION

Field of the Invention

The present invention relates to an imaging optical system such as a zoom lens, and more particularly to an imaging optical system which is suitably used for an image projection apparatus that enlarges and projects an image.

Description of the Related Art

Recently, a high reality and high presence are required resulting from a super resolution of an image, and in order to reproduce them, an imaging optical system having a high resolution performance is desired. Furthermore, an imaging optical system which has an image plane with a higher flatness and a smaller chromatic aberration of magnification is required due to a miniaturization of pixels and a decrease of a permissible width of depth by enhancing the resolution of the imaging optical system. In addition, characteristics in which the flatness of the image plane and the chromatic aberration of magnification do not vary during focusing from an infinity to a close range are required.

In an image projection apparatus such as a projector, it is necessary to provide a space to guide illumination light to an image formation element, and accordingly a back focus of a lens unit needs to be long to some extent. In the image projection apparatus, a pupil is determined by an illumination optical system. In order to ensure a satisfactory illuminance distribution, the lens unit needs to be telecentric at its image side. It is preferred that distortion of the lens unit is appropriately corrected so that distortion does not occur in a projected image with respect to an original image.

Japanese Patent Laid-open No. 2003-222793 discloses an image pickup lens in which a first lens unit is divided into three lenses of a negative lens, a negative lens, and a positive lens and focusing from an infinity to a close range is performed by moving a middle lens unit having a negative refractive power to an enlargement conjugate side. Japanese Patent Laid-open No. 2011-186269 discloses a projection wide-angle lens in which a first lens unit is divided into a negative lens, a positive lens, and a positive lens, and focusing from the infinity to the close range is performed by moving a middle lens unit having a positive refractive power to the enlargement conjugate side and also by moving a lens unit closest to a reduction conjugate side to the reduction conjugate side.

However, in the image pickup lens disclosed in Japanese Patent Laid-open No. 2003-222793 and the projection wide-angle lens disclosed in Japanese Patent Laid-open No. 2011-186269, a power balance of dividing the first lens unit is not optimum, and accordingly it does not have a sufficient performance if extremely-high resolution is required. Furthermore, both of Japanese Patent Laid-open No. 2003-222793 and Japanese Patent Laid-open No. 2011-186269 relate to a fixed focal lens, and therefore factors affected by zooming are not considered.

SUMMARY OF THE INVENTION

The present invention provides an imaging optical system and an image projection apparatus which are capable of forming a high-definition image in which various aberrations are appropriately corrected over a range from a distant place to a close range.

An imaging optical system as one aspect of the present invention includes, in order from an enlargement conjugate side to a reduction conjugate side, a first lens unit having a negative refractive power configured not to move for zooming from a wide-angle end to a telephoto end, and a plurality of lens units configured to move so that a space between lens units adjacent to each other changes during the zooming, the first lens unit includes, in order from the enlargement conjugate side to the reduction conjugate side, a first lens subunit having a negative refractive power, a second lens subunit having a negative refractive power, and a third lens subunit having a positive refractive power, the first lens subunit is configured not to move for focusing from an infinity to a close range, and the second lens subunit and the third lens subunit constitute a focus moving unit configured to move, during the focusing, from the enlargement conjugate side to the reduction conjugate side while a space between the second lens subunit and the third lens subunit is narrowed.

An image projection apparatus as another aspect of the present invention includes an image display element configured to form an original image and the imaging optical system, and the imaging optical system is configured to project the original image formed by the image display element.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

When a large angle of field and a long back focus are required, a so-called retrofocus-type optical system (imaging optical system such as a zoom lens) in which a first lens unit has a negative refractive power is suitably used. In the optical system, the first lens unit is configured not to move (i.e., the first lens unit is fixed) during the zooming (varying the magnification), accordingly it can perform focusing, without contributing to the zooming, with a simple configuration. However, a lens diameter of the first lens unit typically increases as an angle of field is enlarged. When the focusing is performed by the first lens unit, it is difficult to maintain a satisfactory focusing performance because a height of a peripheral principal ray changes.

The imaging optical system of this embodiment is configured by a first lens unit B1 having a negative refractive power which is divided into three lens units. In other words, the first lens unit B1 is divided into a lens subunit B1$a$ (first lens subunit) having a negative refractive power, a lens subunit B1$b$ (second lens subunit) having a negative refractive power, and a lens subunit B1$c$ (third lens subunit) having a positive refractive power. In the imaging optical system of this embodiment, the lens subunits B1$b$ and B1$c$ are configured to retract toward a reduction conjugate side while a space (distance) between the lens subunits B1$b$ and B1$c$ in which a change in height of the principal ray is small is reduced. In this configuration, the imaging optical system capable of performing satisfactory focusing from an infinity to a close range can be achieved.

As described above, the imaging optical system of this embodiment includes, in order from an enlargement conjugate side to a reduction conjugate side, a first lens unit B1 having a negative refractive power configured not to move for zooming from a wide-angle end to a telephoto end, and a plurality of lens units (for example, second lens unit B2 to seventh lens unit B7) configured to move so that a space between lens units adjacent to each other changes during the zooming. The first lens unit B1 includes, in order from the enlargement conjugate side to the reduction conjugate side, a lens subunit B1$a$ (first lens subunit) having a negative refractive power, a lens subunit B1$b$ (second lens subunit) having a negative refractive power, and a lens subunit B1$c$ (third lens subunit) having a positive refractive power. The lens subunit B1$a$ is configured not to move for focusing from an infinity to a close range, and the lens subunits B1$b$ and B1$c$ constitute a focus moving unit configured to move, during the focusing, from the enlargement conjugate side to the reduction conjugate side while a space between the lens subunits B1$b$ and B1$c$ is narrowed.

In the imaging optical system of this embodiment, it is preferred that the following conditional expression (1) is satisfied where fb is a focal length of the lens subunit B1$b$ and fc is a focal length of the lens subunit B1$c$.

$$-5.0 < fb/fc < -1.1 \quad (1)$$

Conditional expression (1) indicates that the focal length fb of the lens subunit B1$b$ is longer than the focal length fc of the lens subunit B1$c$. By satisfying conditional expression (1), an angle of a peripheral principal ray (a principal ray of a peripheral light flux) in the lens subunit B1$b$ can be set to be gentle, and accordingly a satisfactory focusing performance can be easily obtained. When a value exceeds the upper limit of conditional expression (1), a refractive power of the lens subunit B1$b$ is too strong and the angle of the peripheral principal ray is too steep, or a refractive power of the lens subunit B1$c$ is too weak and a chromatic aberration of magnification is not appropriately corrected. On the other hand, when a value exceeds the lower limit of conditional expression (1), a moving amount of the lens subunit B1$b$ during focusing is too large compared with that of the lens subunit B1$c$ and as a result a necessary focusing range cannot be obtained, or the moving amount of the lens subunit B1$b$ is too large and as a result the lens subunit B1$c$ interferes with the lens subunit B1$b$, and accordingly it is not preferable.

In the imaging optical system of this embodiment, it is more preferable that conditional expression (1) is set to be within a range of the following conditional expression (1a) since a more appropriate power arrangement is achieved.

$$-4.0 < fb/fc < -2.0 \quad (1a)$$

In the imaging optical system of this embodiment, it is preferred that the following conditional expression (2) is satisfied where f1 is a focal length of the lens unit B1 and fa is a focal length of the lens subunit B1$a$.

$$0.2 < fa/f1 < 0.6 \quad (2)$$

Conditional expression (2) indicates that the focal length fa of the lens subunit B1$a$ is shorter than the focal length f1 of the first lens unit B1. By satisfying conditional expression (2), the angle of the peripheral principal ray in the lens subunit B1$b$ can be eased while a desired angle of field is obtained. When a value exceeds the upper limit of conditional expression (2), the angle of peripheral principal ray in the lens subunit B1$b$ is strong, and accordingly it is difficult to obtain a satisfactory focusing performance. On the other hand, when a value exceeds the lower limit of conditional expression (2), a refractive power of the lens subunit B1$b$ is too weak or a refractive power of the lens subunit B1$c$ is too strong, and accordingly it is difficult to obtain the satisfactory focusing performance.

In the imaging optical system of this embodiment, it is more preferable that conditional expression (2) is set to be within a range of the following conditional expression (2a) since a more appropriate power arrangement is achieved.

$$0.3 < fa/f1 < 0.5 \quad (2a)$$

In the imaging optical system of this embodiment, it is preferred that the following conditional expression (3) is satisfied where fw is a focal length of an entire system of the imaging optical system at the wide-angle end, and f1 is a focal length of the lens unit B1.

$$-5.0 < f1/fw < -1.5 \quad (3)$$

Conditional expression (3) indicates that the focal length f1 of the first lens unit B1 is longer than the focal length fw of the entire system of the imaging optical system (entirety of the imaging optical system). Especially, a wide-angle lens contributes to the reduction of an entire length and also the reduction of a front lens diameter. When a value exceeds the upper limit of conditional expression (3), an amount of remaining aberration in the first lens unit B1 tends to be large, and thus it is difficult to obtain a satisfactory performance over the entire variable magnification region. Accordingly, it is difficult to obtain a required high-definition image. On the other hand, when a value exceeds the lower limit of conditional expression (3), it is difficult to obtain a desired angle of field.

In the imaging optical system of this embodiment, it is more preferable that conditional expression (3) is set to be within a range of the following conditional expression (3a) since a more appropriate power arrangement is achieved.

$$-4.5 < f1/fw < -2.0 \quad (3a)$$

In the imaging optical system of this embodiment, it is preferred that the following conditional expression (4) is satisfied where $\phi max1B$ is an effective diameter of a lens disposed closest to the enlargement conjugate side in the first lens unit B1, and $\phi maxFB$ is a maximum effective diameter of a plurality of lenses included in the focus moving unit (lens units which move during the focusing).

$$\phi max1B/\phi maxFB > 1.3 \quad (4)$$

Satisfying conditional expression (4), a generation of high-order chromatic aberration of magnification can be reduced by performing achromatization at a position where a height of an off-axis ray is low. In addition, a generation of variation of high-order off-axis aberration can be reduced by performing the focusing at a position where the height of the off-axis ray is low.

In the imaging optical system of this embodiment, it is more preferable that conditional expression (4) is set to be within a range of the following conditional expression (4a).

$$\phi max1B/\phi maxFB > 1.5 \quad (4a)$$

In the imaging optical system of this embodiment, it is preferred that the following conditional expression (5) is satisfied where f is a focal length of each lens moving during the focusing from the infinity to the close range, and vd is an Abbe number of a glass material of the each lens for a d-line (587.56 nm).

$$|fw \times \Sigma(1/(f \cdot vd))| < 0.004 \quad (5)$$

Satisfying conditional expression (5), the variation of the chromatic aberration of magnification during the focusing can be reduced by the appropriate achromatization in the focus moving unit.

In the imaging optical system of this embodiment, it is more preferable that conditional expression (5) is set to be within a range of the following conditional expression (5a).

$$|fw \times \Sigma(1/(f \cdot vd)) \text{ of the focus moving unit}| < 0.003 \quad (5a)$$

In the imaging optical system of this embodiment, it is preferred that the lens subunit B1c is constituted by at least a single negative lens and at least a single positive lens in order from the enlargement conjugate side to the reduction conjugate side. Since the lens subunit B1c is a sole lens unit having a positive refractive power in the first lens unit B1, an aberration such as a chromatic aberration of magnification and a distortion can be appropriately corrected by the cementation for achromatization.

In the imaging optical system of this embodiment, it is preferred that the lens subunit B1b is constituted by a single negative lens. It is more preferable that the lens subunit B1b has a simple configuration in order to ensure a moving amount of the lens subunit B1b having a weak refractive power. When the lens subunit B1b is constituted by a plurality of lenses, compared with an effect of the lens subunit B1b itself, the size of the first lens unit B1 is unnecessarily enlarged, or the entire length is increased. However, if these are acceptable, the lens subunit B1b may be configured by the plurality of lenses.

In the imaging optical system of this embodiment, the lens subunit B1a includes at least a negative meniscus aspherical lens convex toward the enlargement conjugate side.

Hereinafter, with respect to the imaging optical system of this embodiment, specific embodiments will be described.

Embodiment 1

Figure 1:
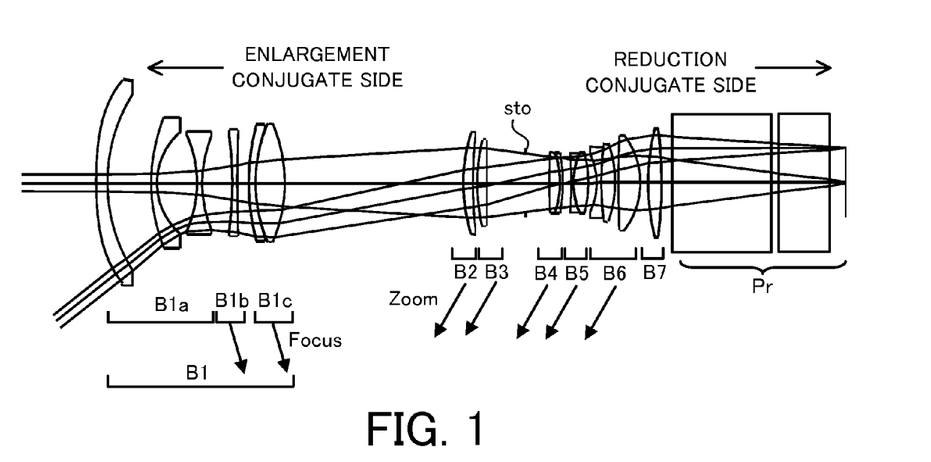
FIG. 1 is a cross-sectional view of an optical system at a wide-angle end in Embodiment 1.

First, referring to FIGS. 1 to 7, an imaging optical system (optical system) in Embodiment 1 will be described. FIG. 1 is a cross-sectional view of the optical system at a wide-angle end in this embodiment. The optical system illustrated in FIG. 1 is a projection optical system that is designed mainly for a projector, and it includes a prism glass Pr disposed closest to the reduction conjugate side. The optical system of this embodiment includes, in order from the enlargement conjugate side to the reduction conjugate side, a first lens unit B1, a second lens unit B2, a third lens unit B3, a stop unit sto, a fourth lens unit B4, a fifth lens unit B5, a sixth lens unit B6, and a seventh lens unit B7. The first lens unit B1 includes, in order from the enlargement conjugate side to the reduction conjugate side, a lens subunit B1a (first lens subunit), a lens subunit B1b (second lens subunit), and a lens subunit B1c (third lens subunit). These basic configurations are applied also to optical systems in Embodiments 2 and 3 described below.

Figure 2:
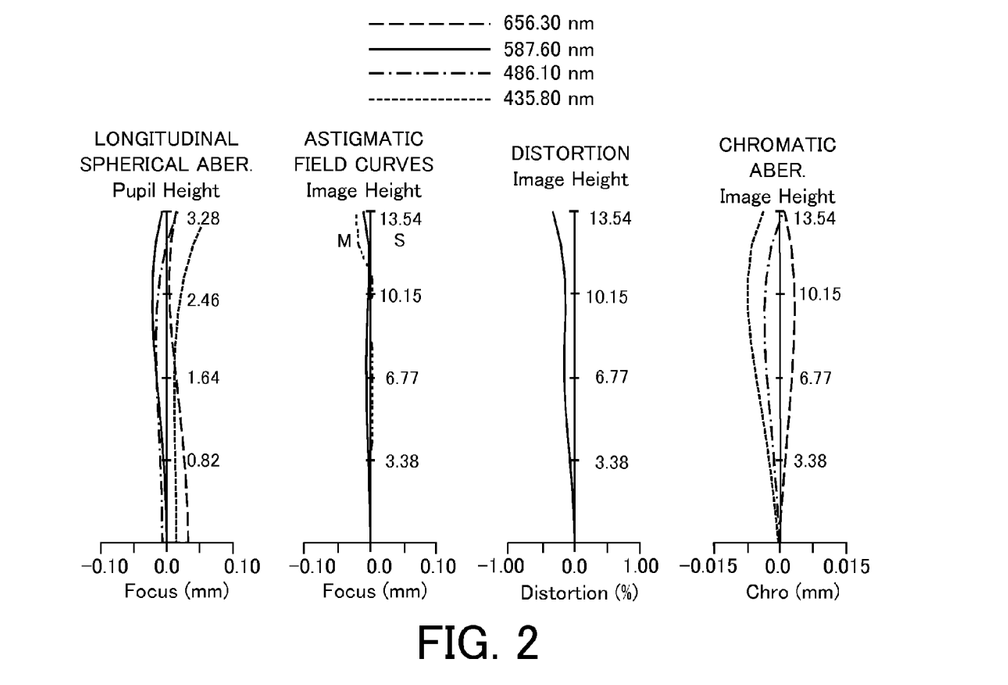
FIG. 2 is an aberration diagram of the optical system at the wide-angle end in Embodiment 1 (object distance: 1096 mm).
Figure 3:
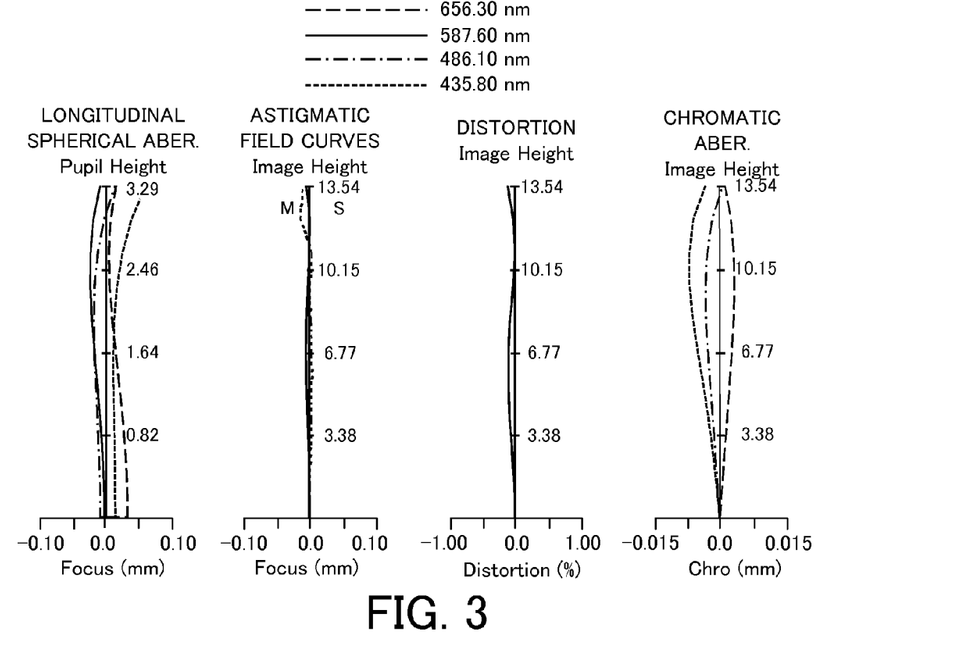
FIG. 3 is an aberration diagram of the optical system at the wide-angle end in Embodiment 1 (object distance: 1534 mm).
Figure 4:
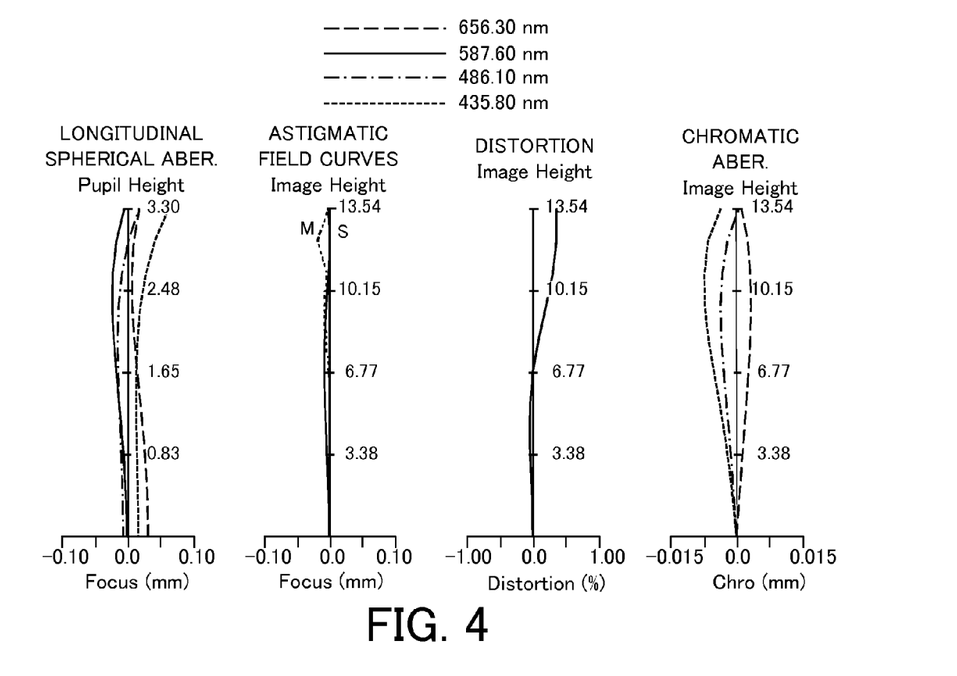
FIG. 4 is an aberration diagram of the optical system at the wide-angle end in Embodiment 1 (object distance: 6576 mm).
Figure 5:
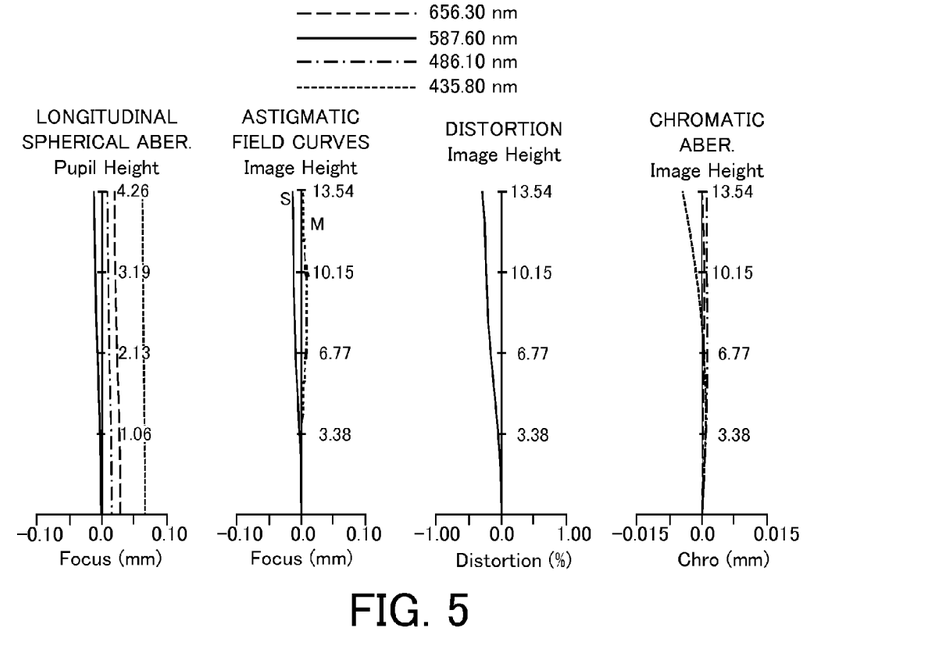
FIG. 5 is an aberration diagram of the optical system at a telephoto end in Embodiment 1 (object distance: 1096 mm).
Figure 6:
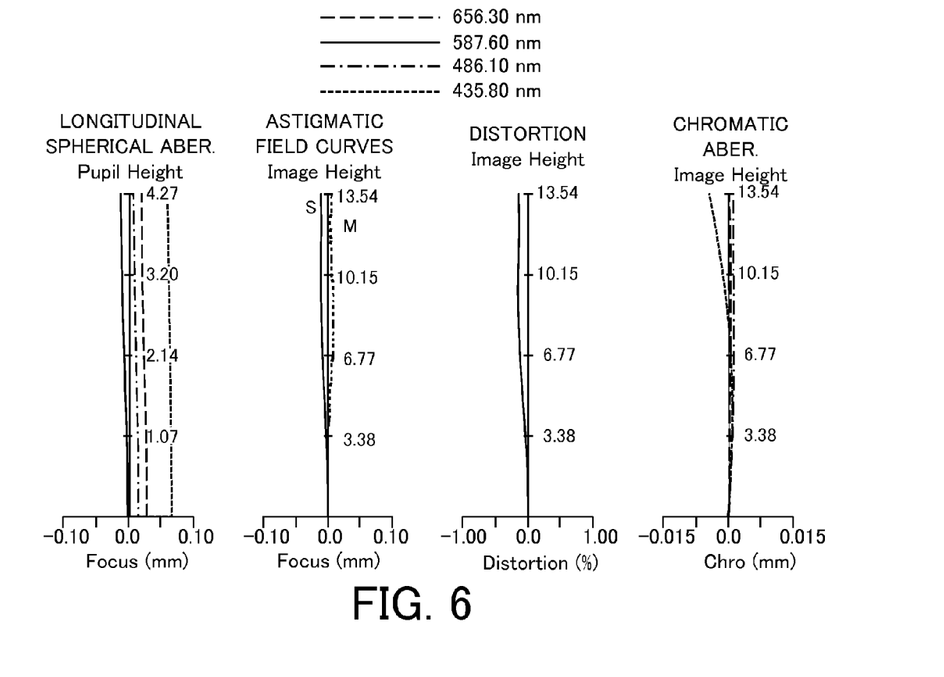
FIG. 6 is an aberration diagram of the optical system at the telephoto end in Embodiment 1 (object distance: 1534 mm).
Figure 7:
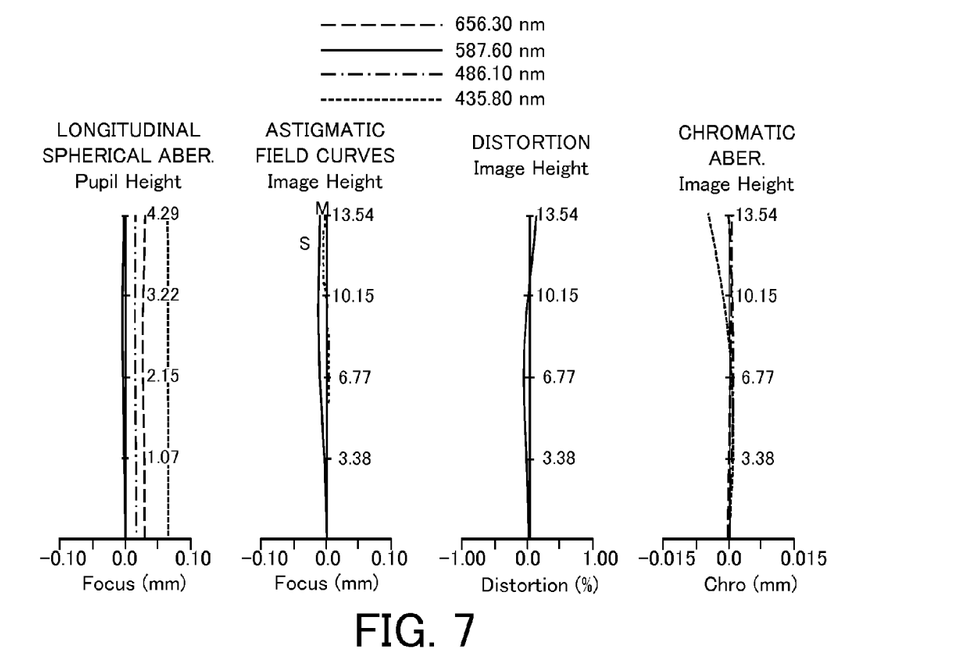
FIG. 7 is an aberration diagram of the optical system at the telephoto end in Embodiment 1 (object distance: 6576 mm).

FIGS. 2, 3, and 4 are aberration diagrams of the optical system at the wide-angle end where object distances are 1096 mm, 1534 mm, and 6576 mm, respectively, and they indicate an imaging performance of the optical system (wide-angle lens) in this embodiment. FIGS. 5, 6, and 7 are aberration diagrams of the optical system at a telephoto end where the object distances are 1096 mm, 1534 mm, and 6576 mm, respectively. In this embodiment, a satisfactory focusing performance is ensured by the effect described above and also the deterioration of the performance is small during the zooming.

In each of FIGS. 2 to 7, in order from the left side, a spherical aberration, astigmatism, distortion, and chromatic aberration of magnification are illustrated. With respect to the spherical aberration, a dashed line indicates an aberration for a C-line (656.3 nm), a solid line indicates an aberration for a d-line (587.6 nm), a dashed-dotted line indicates an aberration for an F-line (486.1 nm), and a dotted line indicates an aberration for a g-line (435.8 nm). A scale of a horizontal axis indicates a defocus amount, which is within a range from −0.10 to +0.10 [mm]. With respect to the astigmatism, a solid line and a dotted line indicate field curvatures for a sagittal image surface and a meridional image surface, respectively. A horizontal axis is the same as that of the spherical aberration. With respect to the distortion, a scale of a horizontal axis is indicated within a range from −1.0 to +1.0 [%].

Numerical example 1 of this embodiment is as follows. In Numerical example 1, a surface number is the number of each of lens surfaces counted from the enlargement conjugate side, symbol R denotes a radius of curvature of each lens surface, symbol D denotes a surface space, and symbols Nd and νd respectively denote a refractive index and Abbe number of the glass material for the d-line (587.56 nm). A lens surface where "s" is added to the right indicates a position of a stop. A lens surface where "*" (asterisk) is added to the right indicates an aspherical surface shape according to the following function whose coefficients are indicated in the numerical example. Symbol y denotes a coordinate in a radial direction with reference to a vertex of a lens surface, and symbol x denotes a coordinate in an optical axis direction with reference to the vertex of the lens surface.

$$x=(y^2/R)/[1+\{1-(1+K)(y^2/R^2)\}^{1/2}]+Ay^4+By^6+Cy^8+Dy^{10}+Ey^{12}+Fy^{14}+Gy^{16}$$

These descriptions are applied also to Numerical examples 2 and 3 described blow.

Numerical Example 1

| f = 17.08-22.19 ω = 38.3~31.3 FNO = 2.6 Φ = 27.08 | | | | | | |
|---|---|---|---|---|---|---|
| no | Φea | R | d | glass | Nd | νd |
| OBJ | | | 1534.00 | | | |
| 1* | 76.00 | 174.392 | 4.20 | SBSL7 | 1.51633 | 64.14 |
| 2 | 67.95 | 62.856 | 17.00 | | | |
| 3 | 47.87 | 55.879 | 2.60 | SLAL8 | 1.71300 | 53.87 |
| 4 | 39.62 | 26.747 | 15.60 | | | |
| 5 | 37.57 | −46.171 | 2.00 | SFPL51 | 1.49700 | 81.54 |
| 6 | 36.41 | 52.340 | VARIABLE | | | |
| 7 | 37.92 | −150.600 | 2.00 | SLAM2 | 1.74400 | 44.79 |
| 8 | 38.79 | 346.851 | VARIABLE | | | |
| 9 | 42.04 | 99.287 | 2.30 | EFDS1W | 1.92286 | 20.88 |
| 10 | 42.32 | 56.193 | 11.50 | SNBH52 | 1.67300 | 38.15 |
| 11 | 43.03 | −56.193 | VARIABLE | | | |
| 12 | 36.87 | 71.947 | 3.30 | SBAL35 | 1.58913 | 61.13 |
| 13 | 36.27 | 141.375 | VARIABLE | | | |
| 14 | 31.32 | 80.940 | 3.55 | FD60W | 1.80518 | 25.46 |
| 15 | 30.73 | −5606.356 | VARIABLE | | | |
| 16 | 22.32 | (STO) | VARIABLE | | | |
| 17 | 21.91 | 368.763 | 3.70 | SBSL7 | 1.51633 | 64.14 |
| 18 | 21.54 | −38.620 | 1.30 | TAFD25 | 1.90366 | 31.31 |
| 19 | 21.52 | −63.551 | VARIABLE | | | |
| 20 | 20.50 | −155.343 | 1.20 | TAFD25 | 1.90366 | 31.31 |
| 21 | 20.77 | 28.776 | 5.90 | SBSL7 | 1.51633 | 64.14 |
| 22 | 21.69 | −41.875 | VARIABLE | | | |
| 23 | 22.44 | −24.146 | 1.30 | TAFD25 | 1.90366 | 31.31 |
| 24 | 25.61 | 96.004 | 5.75 | SBSL7 | 1.51633 | 64.14 |
| 25 | 27.96 | −41.868 | 1.30 | | | |
| 26 | 32.17 | 562.451 | 8.75 | SFPL51 | 1.49700 | 81.54 |
| 27 | 34.11 | −29.109 | VARIABLE | | | |
| 28 | 39.46 | 93.214 | 5.00 | SNPH1 | 1.80810 | 22.76 |
| 29 | 39.38 | −196.899 | 4.39 | | | |
| 30 | 50.00 | ∞ | 38.70 | SBSL7 | 1.51633 | 64.14 |
| 31 | 50.00 | ∞ | 3.00 | | | |
| 32 | 50.00 | ∞ | 19.50 | SF6 | 1.80518 | 25.43 |
| 33 | 50.00 | ∞ | 6.30 | | | |
| IMG | | | | | | |

| ASPHERICAL COEFFICIENT | | |
|---|---|---|
| sur | 1* | 3* |
| R | 5.7342E−03 | 1.7896E−02 |
| k | 0.0000E+00 | 0.0000E+00 |
| A | 2.7472E−06 | −2.1302E−06 |

-continued

| f = 17.08-22.19 ω = 38.3~31.3 FNO = 2.6 Φ = 27.08 | | |
|---|---|---|
| B | −8.7665E−10 | −5.7510E−11 |
| C | 6.1503E−13 | 1.4584E−12 |
| D | −2.6540E−16 | −1.1279E−15 |
| E | 7.6837E−20 | −2.5667E−19 |
| F | 0.0000E+00 | 0.0000E+00 |
| G | 0.0000E+00 | 0.0000E+00 |

| ZOOMING SPACE | | |
|---|---|---|
| sur | wide-angle end | telephoto end |
| 11 | 69.813 | 34.732 |
| 13 | 2.119 | 16.867 |
| 15 | 15.154 | 26.600 |
| 16 | 9.534 | 1.516 |
| 19 | 2.952 | 4.079 |
| 22 | 3.305 | 4.078 |
| 27 | 2.682 | 17.688 |

| CHANGE OF FOCUSING SPACE | | |
|---|---|---|
| sur | object distance | object distance | object distance |
| 0 | 1096 | 1534 | 6576 |
| 6 | 12.555 | 11.408 | 9.427 |
| 8 | 4.212 | 4.782 | 5.768 |
| 11 | 69.237 | 69.813 | 70.808 |

Embodiment 2

Next, referring to FIGS. 8 to 14, an imaging optical system (optical system) in Embodiment 2 will be described. This embodiment relates to the optical system in which an angle of field at a wide-angle end is set to be higher, and accordingly the effect described above can be obtained even when the angle of field is changed. In a lens unit having a higher angle of field, an increase of a lens diameter can be suppressed by setting a back focus to be slightly short.

Figure 8:
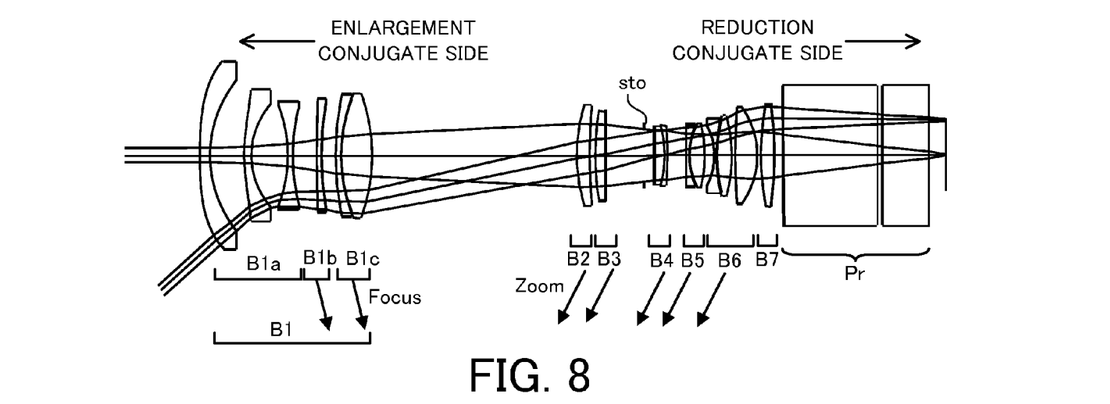
FIG. 8 is a cross-sectional view of an optical system at a wide-angle end in Embodiment 2.
Figure 9:
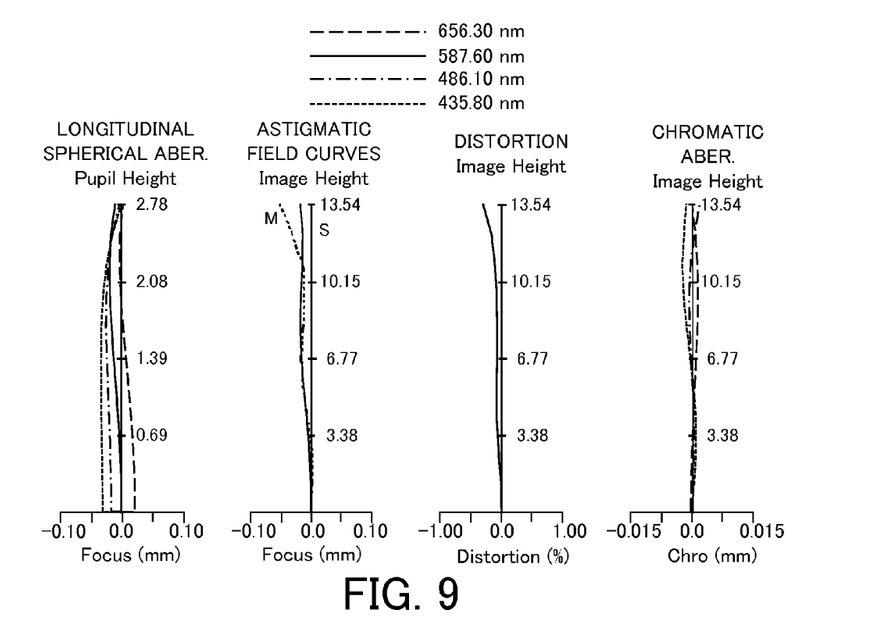
FIG. 9 is an aberration diagram of the optical system at the wide-angle end in Embodiment 2 (object distance: 990 mm).
Figure 10:
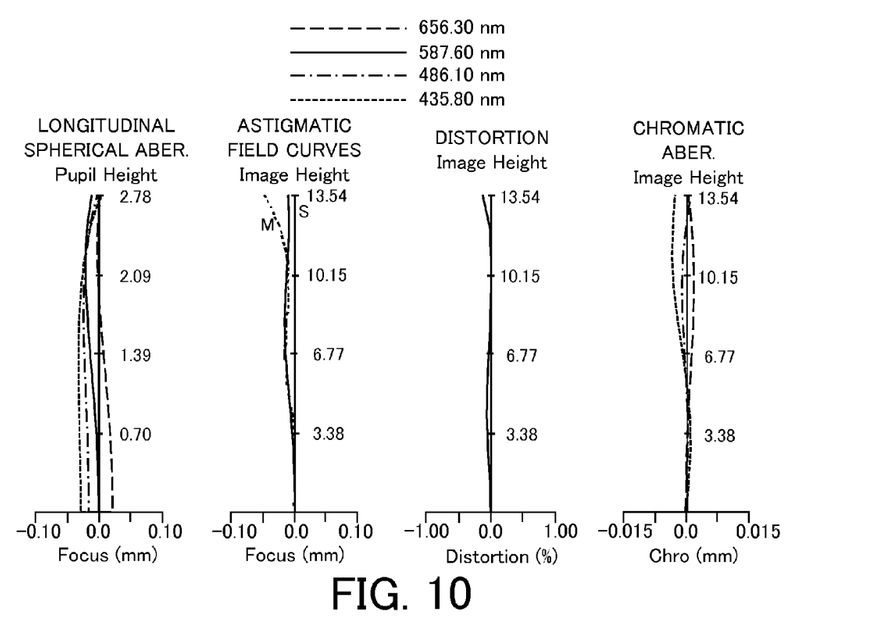
FIG. 10 is an aberration diagram of the optical system at the wide-angle end in Embodiment 2 (object distance: 1386 mm).
Figure 11:
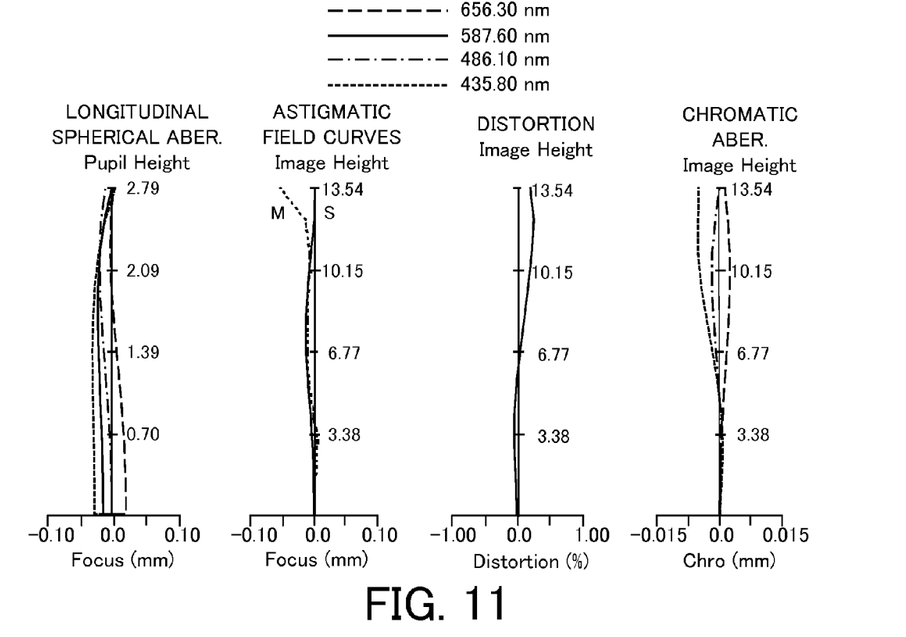
FIG. 11 is an aberration diagram of the optical system at the wide-angle end in Embodiment 2 (object distance: 5940 mm).
Figure 12:
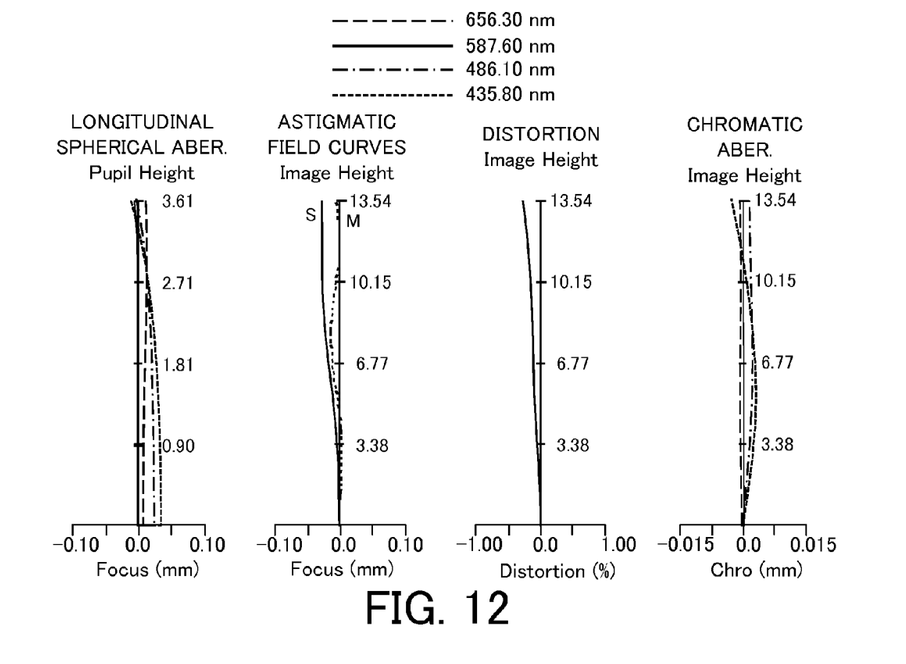
FIG. 12 is an aberration diagram of the optical system at a telephoto end in Embodiment 2 (object distance: 990 mm).
Figure 13:
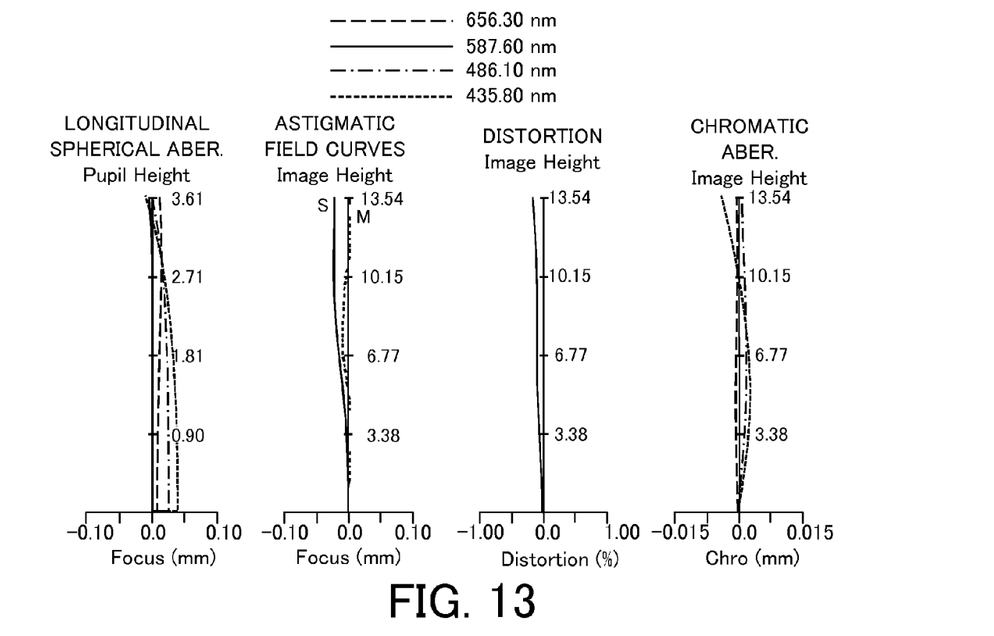
FIG. 13 is an aberration diagram of the optical system at the telephoto end in Embodiment 2 (object distance: 1386 mm).
Figure 14:
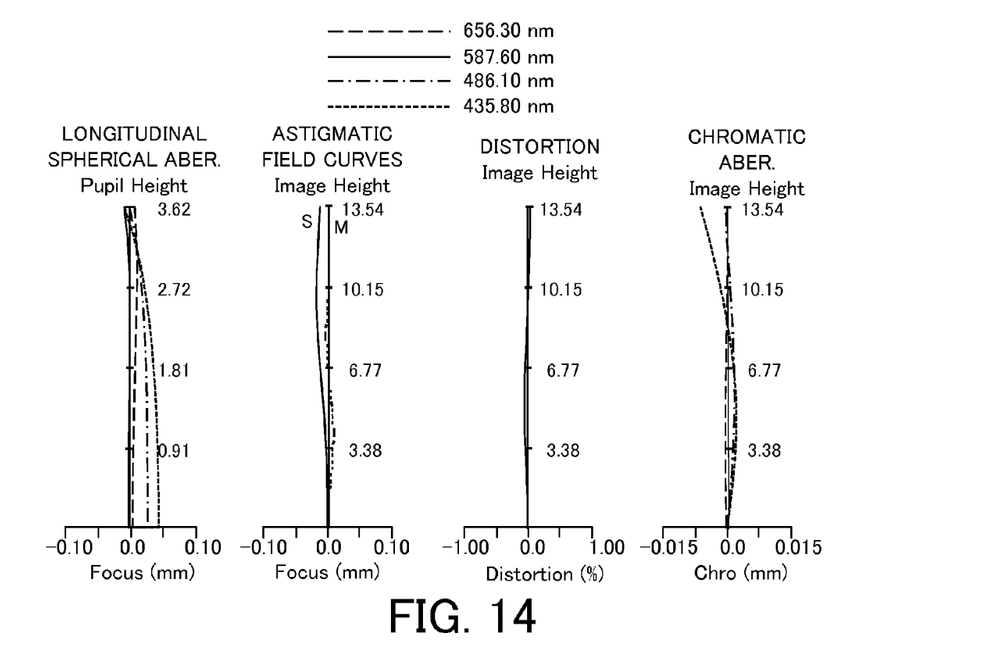
FIG. 14 is an aberration diagram of the optical system at the telephoto end in Embodiment 2 (object distance: 5940 mm).

FIG. 8 is a cross-sectional view of the optical system at a wide-angle end in this embodiment. FIGS. 9, 10, and 11 are aberration diagrams of the optical system at the wide-angle end where object distances are 1096 mm, 1534 mm, and 6576 mm, respectively. FIGS. 12, 13, and 14 are aberration diagrams of the optical system at a telephoto end where the object distances are 1096 mm, 1534 mm, and 6576 mm, respectively. Even in the configuration of this embodiment, a satisfactory performance is ensured by the effect described above and also the deterioration of the performance is small during varying magnification (zooming).

Numerical example 2 of this embodiment is as follows.

Numerical Example 2

| f = 15.00-19.50 ω = 41.9-34.7 FNO = 2.7 Φ = 27.08 | | | | | | |
|---|---|---|---|---|---|---|
| no | Φea | R | d | glass | Nd | νd |
| OBJ | | | 1386.00 | | | |
| 1* | 68.06 | 244.623 | 4.30 | SLAL54 | 1.65100 | 56.16 |
| 2 | 57.43 | 47.632 | 12.98 | | | |
| 3* | 47.08 | 77.905 | 2.60 | SLAH66 | 1.77250 | 49.60 |
| 4 | 39.33 | 29.100 | 13.91 | | | |
| 5 | 38.27 | −50.549 | 2.00 | SFPL51 | 1.49700 | 81.54 |
| 6 | 38.34 | 77.784 | VARIABLE | | | |
| 7 | 40.44 | 377.212 | 2.00 | SLAM2 | 1.74400 | 44.79 |
| 8* | 40.80 | 120.969 | VARIABLE | | | |

-continued

| | | f = 15.00-19.50 ω = 41.9-34.7 FNO = 2.7 Φ = 27.08 | | | | |
|---|---|---|---|---|---|---|
| 9 | 43.49 | 107.756 | 2.30 | EFDS1W | 1.92286 | 20.88 |
| 10 | 43.87 | 60.874 | 12.00 | SNBH8 | 1.72047 | 34.71 |
| 11 | 44.65 | −62.683 | VARIABLE | | | |
| 12 | 35.68 | 59.671 | 5.00 | SFSL5 | 1.48749 | 70.24 |
| 13 | 34.78 | 170.902 | VARIABLE | | | |
| 14 | 31.69 | 92.491 | 4.00 | SNPH1 | 1.80810 | 22.76 |
| 15 | 30.94 | 920.325 | VARIABLE | | | |
| 16 | 20.16 | (STO) | VARIABLE | | | |
| 17 | 20.30 | 206.783 | 3.90 | SBSL7 | 1.51633 | 64.14 |
| 18 | 20.45 | −47.474 | 1.30 | TAFD25 | 1.90366 | 31.31 |
| 19 | 20.71 | −103.642 | VARIABLE | | | |
| 20 | 21.57 | 608.587 | 1.20 | TAFD25 | 1.90366 | 31.31 |
| 21 | 21.83 | 26.697 | 6.20 | SBSL7 | 1.51633 | 64.14 |
| 22 | 22.69 | −48.214 | VARIABLE | | | |
| 23 | 23.23 | −27.024 | 1.30 | TAFD25 | 1.90366 | 31.31 |
| 24 | 26.23 | 70.919 | 5.70 | SFPM3 | 1.53775 | 74.70 |
| 25 | 28.45 | −53.515 | 1.00 | | | |
| 26 | 32.36 | 175.815 | 8.40 | SFPL51 | 1.49700 | 81.54 |
| 27 | 33.93 | −31.348 | VARIABLE | | | |
| 28 | 36.71 | 116.020 | 5.00 | EFDS1W | 1.92286 | 20.88 |
| 29 | 36.65 | −169.373 | 3.40 | | | |
| 30 | 50.00 | ∞ | 36.00 | SBSL7 | 1.51633 | 64.14 |
| 31 | 50.00 | ∞ | 2.00 | | | |
| 32 | 50.00 | ∞ | 18.00 | SF6 | 1.80518 | 25.43 |
| 33 | 50.00 | ∞ | 6.32 | | | |
| IMG | | | | | | |

ASPHERICAL COEFFICIENT

| sur | 1 | 3* | 8* |
|---|---|---|---|
| R | 2.4462E+02 | 7.7905E+01 | 1.2097E+02 |
| k | 0.0000E+00 | 0.0000E+00 | 0.0000E+00 |
| A | 5.5846E−06 | −6.0973E−06 | −5.9828E−07 |
| B | −3.7134E−09 | 3.2008E−09 | 2.0009E−10 |
| C | 3.2427E−12 | 2.1023E−12 | 5.5788E−13 |
| D | −1.6355E−15 | −7.6396E−15 | −2.3927E−15 |
| E | 4.8440E−19 | 5.3378E−18 | 2.3680E−18 |
| F | 0.0000E+00 | 0.0000E+00 | 0.0000E+00 |
| G | 0.0000E+00 | 0.0000E+00 | 0.0000E+00 |

ZOOMING SPACE

| sur | wide-angle end | telephoto end |
|---|---|---|
| 11 | 77.917 | 46.127 |
| 13 | 2.000 | 11.294 |
| 15 | 14.948 | 27.169 |
| 16 | 3.676 | 1.500 |
| 19 | 7.159 | 2.078 |
| 22 | 3.269 | 3.112 |
| 27 | 1.600 | 19.289 |

CHANGE OF FOCUSING SPACE

| sur | object distance | object distance | object distance |
|---|---|---|---|
| 0 | 990 | 1386 | 5940 |
| 6 | 10.0140 | 8.9910 | 6.8744 |
| 8 | 4.5301 | 5.1874 | 6.5699 |
| 11 | 77.5511 | 77.9169 | 78.6509 |

Embodiment 3

Next, referring to FIGS. 15 to 21, an imaging optical system (optical system) in Embodiment 3 will be described. This embodiment relates to the optical system in which an angle of field at a wide-angle end is set to be higher, and accordingly the effect described above can be obtained even when the angle of field is changed. In a lens unit having a higher angle of field, an increase of a lens diameter can be suppressed by setting a back focus to be slightly short.

Figure 15:
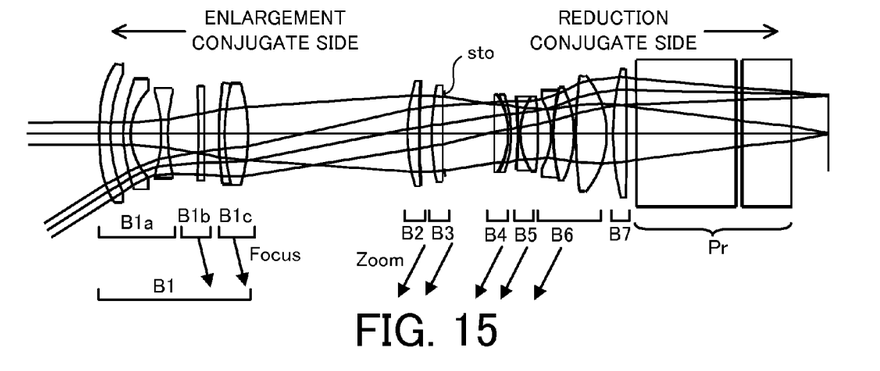
FIG. 15 is a cross-sectional view of an optical system at a wide-angle end in Embodiment 3.
Figure 16:
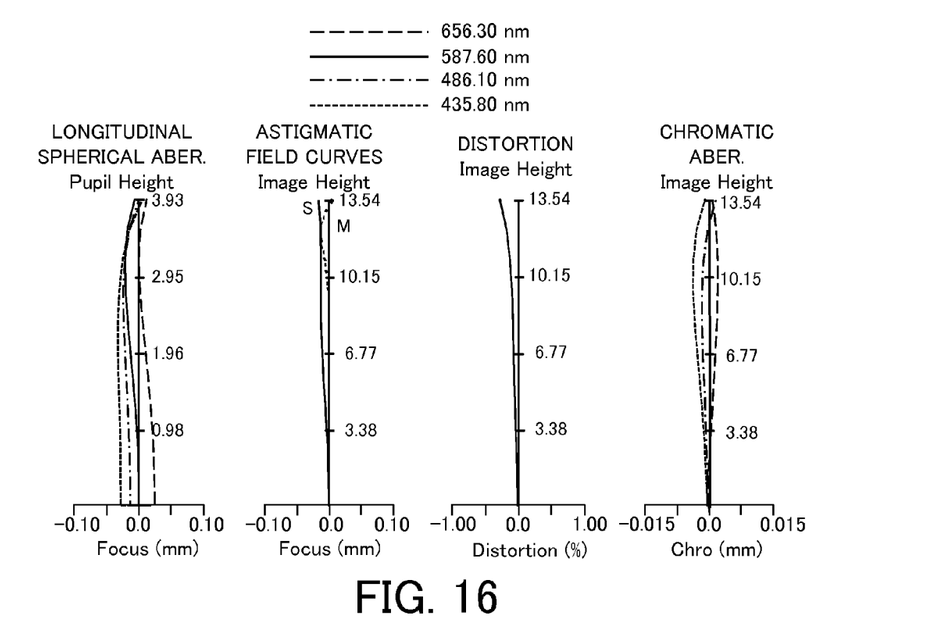
FIG. 16 is an aberration diagram of the optical system at the wide-angle end in Embodiment 3 (object distance: 1100 mm).
Figure 17:
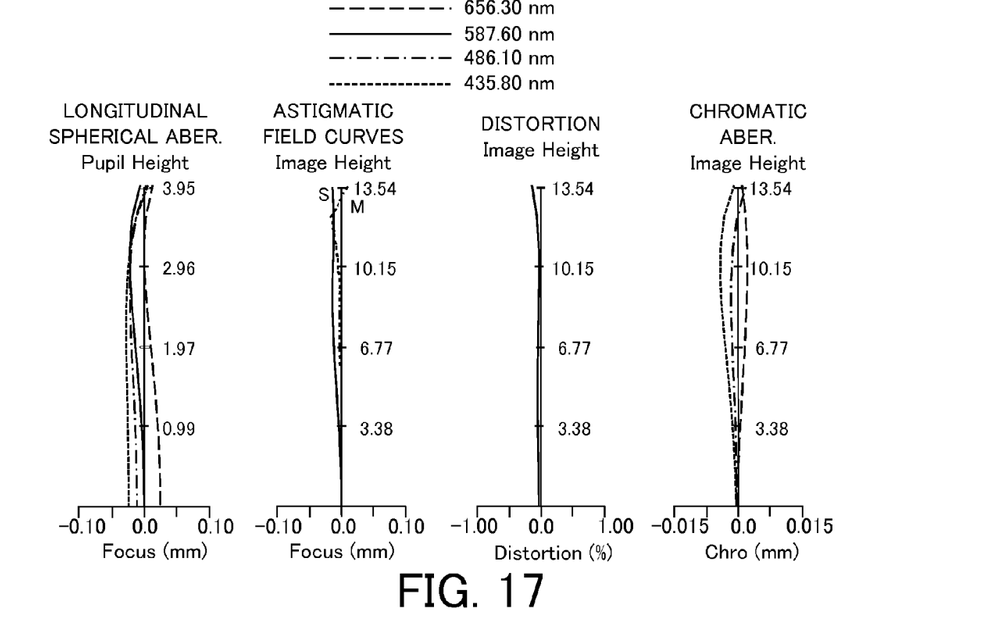
FIG. 17 is an aberration diagram of the optical system at the wide-angle end in Embodiment 3 (object distance: 1960 mm).
Figure 18:
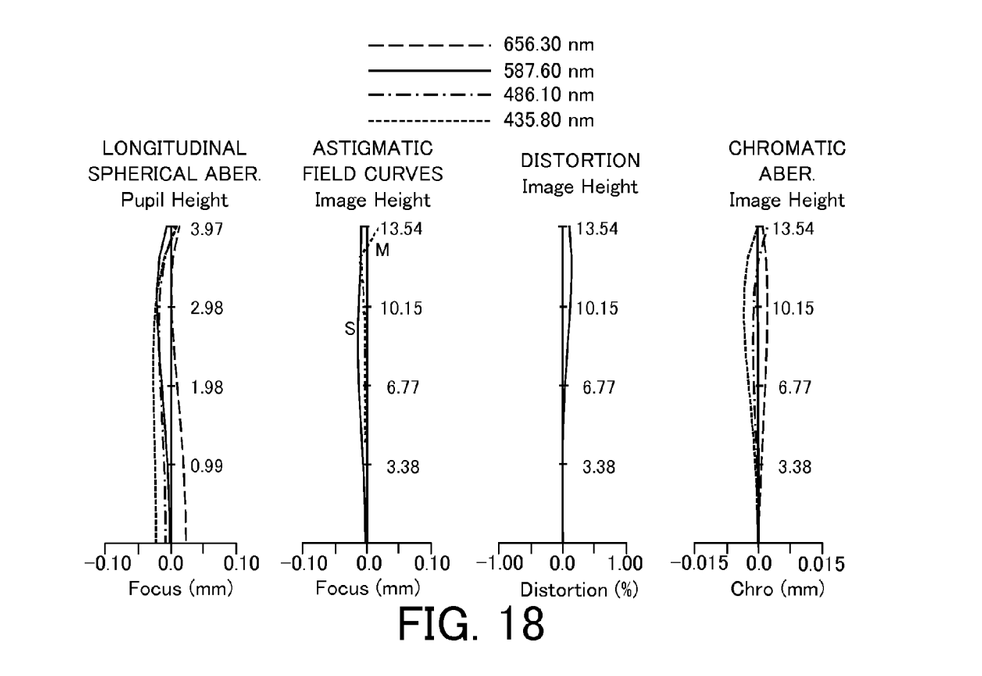
FIG. 18 is an aberration diagram of the optical system at the wide-angle end in Embodiment 3 (object distance: 8400 mm).
Figure 19:
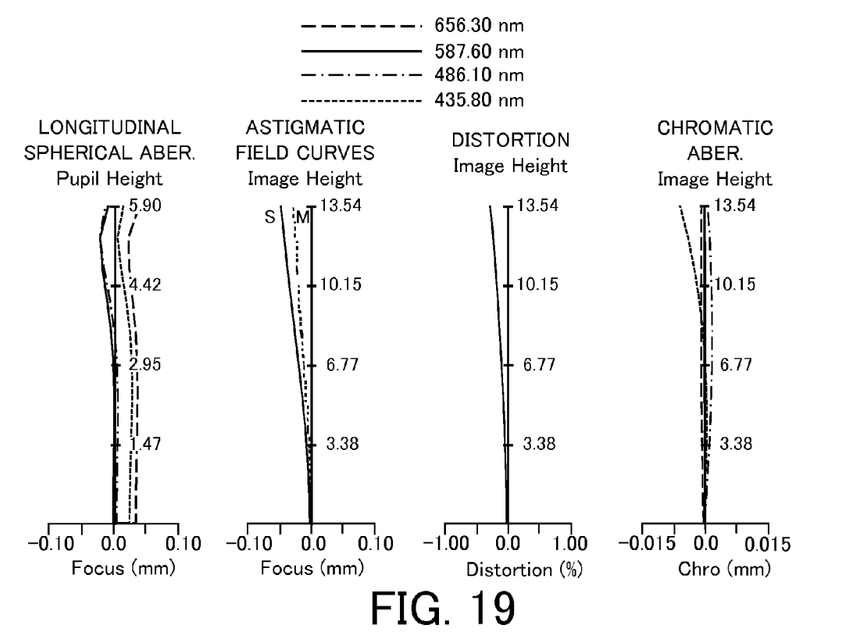
FIG. 19 is an aberration diagram of the optical system at a telephoto end in Embodiment 3 (object distance: 1100 mm).
Figure 20:
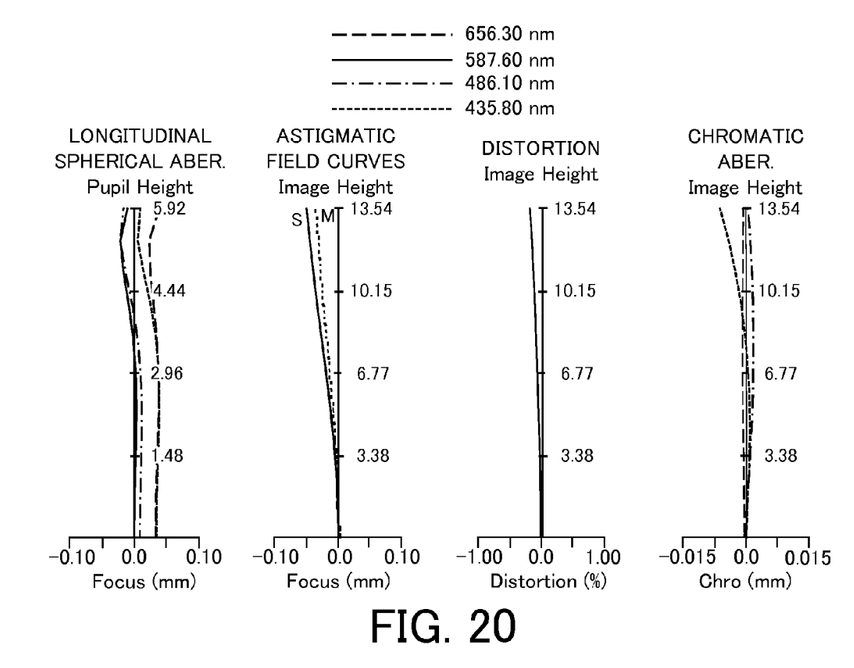
FIG. 20 is an aberration diagram of the optical system at the telephoto end in Embodiment 3 (object distance: 1960 mm).
Figure 21:
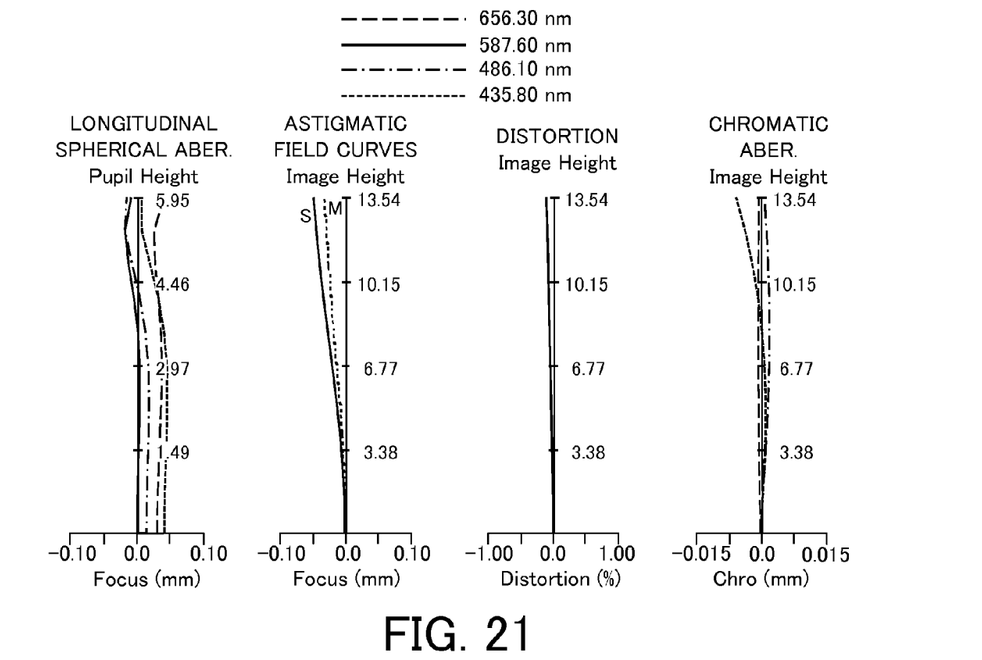
FIG. 21 is an aberration diagram of the optical system at the telephoto end in Embodiment 3 (object distance: 8400 mm).

FIG. 15 is a cross-sectional view of the optical system at a wide-angle end in this embodiment. FIGS. 16, 17, and 18 are aberration diagrams of the optical system at the wide-angle end where object distances are 1096 mm, 1534 mm, and 6576 mm, respectively. FIGS. 19, 20, and 21 are aberration diagrams of the optical system at a telephoto end where the object distances are 1096 mm, 1534 mm, and 6576 mm, respectively. Even in the configuration of this embodiment, a satisfactory performance is ensured by the effect described above and also the deterioration of the performance is small during varying magnification (zooming).

Numerical example 3 of this embodiment is as follows.

Numerical Example 3

| | | f = 21.30-31.95 ω = 32.4~23.0 FNO = 2.7 Φ = 27.08 | | | | |
|---|---|---|---|---|---|---|
| no | Φea | R | d | glass | Nd | vd |
| OBJ | | | 1960.00 | | | |
| 1* | 46.71 | 116.095 | 3.50 | SLAL54 | 1.65100 | 56.16 |
| 2 | 42.02 | 47.693 | 4.96 | | | |
| 3* | 37.00 | 41.260 | 3.00 | SLAH66 | 1.77250 | 49.60 |
| 4 | 31.58 | 24.490 | 10.82 | | | |
| 5 | 30.24 | −46.081 | 2.00 | SFPL51 | 1.49700 | 81.54 |
| 6 | 29.75 | 62.271 | VARIABLE | | | |
| 7 | 31.19 | −230.163 | 1.80 | SLAM2 | 1.74400 | 44.79 |
| 8 | 31.54 | 416.921 | VARIABLE | | | |
| 9 | 33.40 | 124.309 | 2.00 | EFDS1W | 1.92286 | 20.88 |
| 10 | 33.58 | 61.389 | 8.71 | SNBH8 | 1.72047 | 34.71 |
| 11 | 34.21 | −62.631 | VARIABLE | | | |
| 12 | 35.15 | 64.340 | 4.47 | SFSL5 | 1.48749 | 70.24 |
| 13 | 34.90 | 321.713 | VARIABLE | | | |
| 14 | 32.37 | 82.853 | 4.00 | SNPH1 | 1.80810 | 22.76 |
| 15 | 31.81 | −11000.000 | VARIABLE | | | |
| 16 | 25.85 | (STO) | VARIABLE | | | |
| 17 | 25.60 | −2886.335 | 5.00 | SBSL7 | 1.51633 | 64.14 |
| 18 | 25.49 | −28.651 | 1.30 | TAFD25 | 1.90366 | 31.31 |
| 19 | 25.86 | −43.676 | VARIABLE | | | |
| 20 | 24.20 | −456.978 | 1.20 | TAFD25 | 1.90366 | 31.31 |
| 21 | 23.95 | 25.767 | 6.30 | SBSL7 | 1.51633 | 64.14 |
| 22 | 24.59 | −91.896 | VARIABLE | | | |
| 23 | 25.19 | −25.866 | 1.30 | TAFD25 | 1.90366 | 31.31 |
| 24 | 28.95 | 76.160 | 7.00 | SFPM3 | 1.53775 | 74.70 |
| 25 | 31.29 | −40.178 | 1.00 | | | |
| 26 | 36.49 | 218.940 | 10.80 | SFPL51 | 1.49700 | 81.54 |
| 27 | 38.72 | −32.948 | VARIABLE | | | |
| 28 | 43.24 | 94.252 | 5.00 | EFDS1W | 1.92286 | 20.88 |
| 29 | 42.96 | −714.256 | 3.40 | | | |
| 30 | 50.00 | ∞ | 36.00 | SBSL7 | 1.51633 | 64.14 |
| 31 | 50.00 | ∞ | 2.00 | | | |
| 32 | 50.00 | ∞ | 18.00 | SF6 | 1.80518 | 25.43 |
| 33 | 50.00 | ∞ | 13.18 | | | |
| IMG | | | | | | |

ASPHERICAL COEFFICIENT

| sur | 1* | 3* |
|---|---|---|
| R | 1.1610E+02 | 4.1260E+01 |
| k | 0.0000E+00 | 0.0000E+00 |
| A | 8.9547E−06 | −8.1377E−06 |
| B | −6.9875E−09 | 1.0570E−09 |
| C | 9.7423E−12 | 8.1343E−12 |
| D | −6.5271E−15 | −3.3387E−14 |
| E | 4.1138E−18 | 3.2109E−17 |
| F | 0.0000E+00 | 0.0000E+00 |
| G | 0.0000E+00 | 0.0000E+00 |

ZOOMING SPACE

| sur | wide-angle end | telephoto end |
|---|---|---|
| 11 | 57.156 | 10.000 |
| 13 | 4.292 | 24.529 |

-continued f = 21.30-31.95 ω = 32.4~23.0 FNO = 2.7 Φ = 27.08

| | | |
|---|---|---|
| 15 | 1.000 | 16.821 |
| 16 | 17.696 | 1.500 |
| 19 | 2.000 | 6.332 |
| 22 | 4.417 | 6.226 |
| 27 | 2.540 | 23.691 |

CHANGE OF FOCUSING SPACE

| sur | object distance | object distance | object distance |
|---|---|---|---|
| 0 | 1100 | 1960 | 8400 |
| 6 | 13.434 | 11.352 | 8.868 |
| 8 | 4.198 | 5.397 | 6.886 |
| 11 | 56.274 | 57.156 | 58.152 |

Table 1 indicates numerical values of each of the imaging optical system in Embodiments 1 to 3. Table 2 indicates conditional expressions (1) to (5) of each of the imaging optical systems in Embodiments 1 to 3.

TABLE 1

| | EMBODIMENT | | |
|---|---|---|---|
| | 1 | 2 | 3 |
| FOCAL LENGTH fw AT WIDE-ANGLE END | 17.076 | 15.00 | 21.30 |
| FOCAL LENGTH ft AT TELEPHOTO END | 22.193 | 19.50 | 31.95 |
| FOCAL LENGTH f1 OF FIRST LENS UNIT | −54.353 | −55.32 | −58.832 |
| FOCAL LENGTH f2 OF SECOND LENS UNIT | 244.372 | 185.339 | 164.042 |
| FOCAL LENGTH f3 OF THIRD LENS UNIT | 99.121 | 126.968 | 101.778 |
| FOCAL LENGTH f4 OF FOURTH LENS UNIT | 176.694 | 323.935 | 139.079 |
| FOCAL LENGTH f5 OF FIFTH LENS UNIT | −166.006 | −574.33 | −90.867 |
| FOCAL LENGTH f6 OF SIXTH LENS UNIT | −398.305 | −384.338 | −8562.7 |
| FOCAL LENGTH f7 OF SEVENTH LENS UNIT | 78.896 | 75.243 | 90.493 |
| MOVING AMOUNT m1 OF FIRST LENS UNIT | 0.000 | 0.000 | 0.000 |
| MOVING AMOUNT m2 OF SECOND LENS UNIT | −35.081 | −31.79 | −47.154 |
| MOVING AMOUNT m3 OF THIRD LENS UNIT | −20.333 | −22.496 | −26.917 |
| MOVING AMOUNT msto OF STOP UNIT | −8.887 | −10.275 | −11.096 |
| MOVING AMOUNT m4 OF FOURTH LENS UNIT | −16.906 | −12.451 | −27.292 |
| MOVING AMOUNT m5 OF FIFTH LENS UNIT | −15.779 | −17.532 | −22.96 |
| MOVING AMOUNT m6 OF SIXTH LENS UNIT | −15.006 | −17.689 | −21.151 |
| MOVING AMOUNT m7 OF SEVENTH LENS UNIT | 0.000 | 0.000 | 0.000 |
| AIR CONVERSION LENGTH OF BACK FOCUS | 50.000 | 45.276 | 52.061 |

TABLE 2

| CONDITIONAL EXPRESSIONS | EMBODIMENT | | |
|---|---|---|---|
| | 1 | 2 | 3 |
| (1) | −2.302 | −3.897 | −3.051 |
| (2) | 0.382 | 0.327 | 0.387 |
| (3) | −3.183 | −3.689 | −2.762 |

TABLE 2-continued

| CONDITIONAL EXPRESSIONS | EMBODIMENT | | |
|---|---|---|---|
| | 1 | 2 | 3 |
| (4) | 1.76621 | 1.5243 | 1.36539 |
| (5) | 0.001895 | 0.00365 | 0.003809 |

Figure 22:
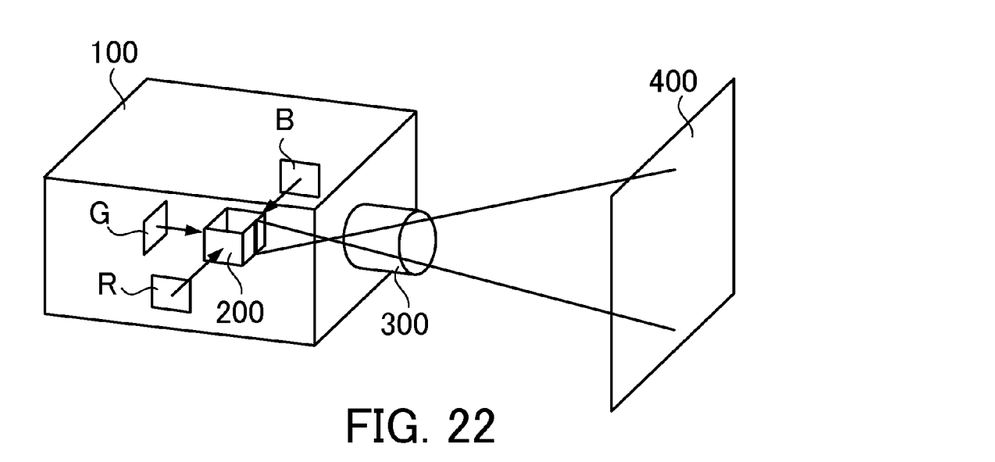
FIG. 22 is a schematic diagram of an image projection apparatus in each embodiment.

Next, referring to FIG. 22, an image projection apparatus including the imaging optical system (zoom lens) in each embodiment will be described. FIG. 22 is a schematic diagram of an image projection apparatus (projector 100) in this embodiment. FIG. 22 illustrates an example in which the imaging optical system of each embodiment is applied to a three-plate type color liquid crystal projector. The projector 100 synthesizes, through a color synthesis unit, image information of a plurality of color lights based on a plurality of liquid crystal display elements (image display elements) which form an original image, and enlarges and projects the synthesized image on a screen by using a projection lens.

In FIG. 22, the projector 100 (color liquid crystal projector) includes three panels (image display elements) of R (red), G (green), and B (blue). Furthermore, the projector 100 includes a prism 200 as the color synthesis unit that synthesizes each of the color lights from the panels of R, G, and B. The prism 200 synthesizes three optical paths to be a single optical path, and the projector 100 projects the synthesized image on a screen 400 by using a projection lens 300 including the imaging optical system (zoom lens) described above. Thus, by applying the imaging optical system of each embodiment to the projector or the like, an image projection apparatus having a high optical performance can be achieved.

According to each embodiment, an imaging optical system and an image projection apparatus can be provided which are capable of forming a high-definition image in which various aberrations are appropriately corrected over a range from a distant place to a close range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-231453, filed on Nov. 14, 2014, which is hereby incorporated by reference herein in its entirety.

What is claimed is:

1. An imaging optical system comprising:
in order from an enlargement conjugate side to a reduction conjugate side,
a first lens unit having a negative refractive power configured not to move for zooming from a wide-angle end to a telephoto end; and
a plurality of lens units configured to move so that a space between lens units adjacent to each other changes during the zooming,
wherein the first lens unit includes, in order from the enlargement conjugate side to the reduction conjugate side, a first lens subunit having a negative refractive power, a second lens subunit having a negative refractive power, and a third lens subunit having a positive refractive power,
wherein the first lens subunit is configured not to move for focusing from an infinity to a close range, and wherein both the second lens subunit and the third lens subunit are configured to move, during the focusing from the infinity to the close range, from the enlargement conjugate side to the reduction conjugate side while a space between the second lens subunit and the third lens subunit is narrowed.

2. The imaging optical system according to claim 1, wherein the conditional expression below is satisfied:

$$-5.0 < fb/fc < -1.1,$$

where fb is a focal length of the second lens subunit and fc is a focal length of the third lens subunit.

3. The imaging optical system according to claim 1, wherein the conditional expression below is satisfied:

$$0.2 < fa/f1 < 0.6,$$

where f1 is a focal length of the first lens unit and fa is a focal length of the first lens subunit.

4. The imaging optical system according to claim 1, wherein the conditional expression below is satisfied:

$$-5.0 < f1/fw < -1.5,$$

where fw is a focal length of an entire system of the imaging optical system at the wide-angle end, and f1 is a focal length of the first lens unit.

5. The imaging optical system according to claim 1, wherein the conditional expression below is satisfied:

$$\phi max1B/\phi maxFB > 1.3,$$

where $\phi max1B$ is an effective diameter of a lens disposed closest to the enlargement conjugate side in the first lens unit, and $\phi maxFB$ is a maximum effective diameter of a plurality of lenses moving during the focusing from the infinity to the close range.

6. The imaging optical system according to claim 1, wherein the conditional expression below is satisfied:

$$|fw \times \Sigma(1/(f \cdot vd))| < 0.004,$$

where fw is a focal length of an entire system of the imaging optical system at the wide-angle end, f is a focal length of each lens moving during the focusing from the infinity to the close range, and vd is an Abbe number of a glass material of the each lens for a d-line.

7. The imaging optical system according to claim 1, wherein the second lens subunit is constituted by a single negative lens.

8. The imaging optical system according to claim 1, wherein the third lens subunit is constituted by at least a single negative lens and at least a single positive lens in order from the enlargement conjugate side to the reduction conjugate side.

9. The imaging optical system according to claim 1, wherein the first lens subunit includes at least a negative meniscus aspherical lens convex toward the enlargement conjugate side.

10. An image projection apparatus comprising:
an image display element configured to form an original image; and
an imaging optical system,
wherein the imaging optical system includes, in order from an enlargement conjugate side to a reduction conjugate side, a first lens unit having a negative refractive power configured not to move for zooming from a wide-angle end to a telephoto end, and a plurality of lens units configured to move so that a space between lens units adjacent to each other changes during the zooming,
wherein the first lens unit includes, in order from the enlargement conjugate side to the reduction conjugate side, a first lens subunit having a negative refractive power, a second lens subunit having a negative refractive power, and a third lens subunit having a positive refractive power,
wherein the first lens subunit is configured not to move for focusing from an infinity to a close range,
wherein both the second lens subunit and the third lens subunit are configured to move, during the focusing from the infinity to the close range, from the enlargement conjugate side to the reduction conjugate side while a space between the second lens subunit and the third lens subunit is narrowed, and
wherein the imaging optical system is configured to project the original image formed by the image display element.

* * * * *